(12) United States Patent
Kranz

(10) Patent No.: US 9,323,939 B2
(45) Date of Patent: Apr. 26, 2016

(54) MULTI-TENANCY GOVERNANCE IN A CLOUD COMPUTING ENVIRONMENT

(71) Applicant: CA, Inc., Islandia, NY (US)

(72) Inventor: Kenneth James Kranz, Sayville, NY (US)

(73) Assignee: CA, Inc., Islandia, NY (US)

( * ) Notice: Subject to any disclaimer, the term of this patent is extended or adjusted under 35 U.S.C. 154(b) by 285 days.

(21) Appl. No.: 13/717,381

(22) Filed: Dec. 17, 2012

(65) Prior Publication Data

US 2014/0173694 A1    Jun. 19, 2014

(51) Int. Cl.
*G06F 21/60* (2013.01)
*G06F 21/62* (2013.01)

(52) U.S. Cl.
CPC ............ *G06F 21/606* (2013.01); *G06F 21/604* (2013.01); *G06F 21/629* (2013.01); *G06F 21/6281* (2013.01)

(58) Field of Classification Search
CPC .. G06F 21/604; G06F 21/6281; G06F 21/629
USPC .................................................. 726/4, 28–29
See application file for complete search history.

(56) References Cited

U.S. PATENT DOCUMENTS

| | | | |
|---|---|---|---|
| 2002/0062449 A1* | 5/2002 | Perna et al. ................... 713/200 |
| 2008/0109912 A1* | 5/2008 | Rivera ............................ 726/30 |
| 2012/0011077 A1 | 1/2012 | Bhagat |
| 2012/0016999 A1* | 1/2012 | Kieselbach et al. .......... 709/229 |
| 2012/0072985 A1 | 3/2012 | Davne et al. |
| 2012/0144454 A1* | 6/2012 | Lee ..................................... 726/4 |
| 2012/0239699 A1* | 9/2012 | Anand et al. .................. 707/792 |
| 2012/0246740 A1* | 9/2012 | Brooker et al. ................. 726/28 |
| 2012/0324529 A1* | 12/2012 | Rangachari et al. .............. 726/1 |
| 2013/0091547 A1* | 4/2013 | Venkatesh et al. ................ 726/4 |
| 2014/0137179 A1* | 5/2014 | Christodorescu et al. ........ 726/1 |

OTHER PUBLICATIONS

Stefan Berger, Ramón Cáceres, Dimitrios Pendarakis, Reiner Sailer, Enriquillo Valdez, Ronald Perez, Wayne Schildhauer, and Deepa Srinivasan, "TVDc: managing security in the trusted virtual datacenter", SIGOPS Oper. Syst. Rev. vol. 42, pp. 40-47 (Jan. 2008).*

* cited by examiner

Primary Examiner — Theodore C Parsons
(74) Attorney, Agent, or Firm — Gilliam IP PLLC

(57) ABSTRACT

A cloud computing system includes a plurality of tenants that are permitted to access cloud hosted applications. The system includes an input governance layer associated with each application, and an output governance layer associated with each application. The input governance layer and the output governance layer include an encapsulation of a cloud hosted application. The governance layers receive a request from a tenant-user to access a first application on the cloud computing system, check a governance database to determine if the tenant-user is authorized to access the first application, and allows or denies access accordingly.

17 Claims, 8 Drawing Sheets

MULTI-TENANCY GOVERNANCE IN A CLOUD COMPUTING ENVIRONMENT

TECHNICAL FIELD

The current disclosure relates to cloud computing systems, and in an embodiment, but not by way of limitation, multi-tenant governance in a cloud computing environment.

BACKGROUND

Cloud computing is being utilized by more and more business organizations. Cloud computing is the use of computing resources (hardware and software) that are delivered as a service over a network (typically the Internet). Cloud computing entrusts remote services with a user's data, software, and computation. In a business model using software as a service (SaaS), users are provided access to application software and databases. The cloud providers manage the infrastructure and platforms on which the applications run. SaaS is sometimes referred to as "on-demand software."

Proponents claim that SaaS allows a business the potential to reduce information technology (IT) operational costs by outsourcing hardware and software maintenance and support to the cloud provider. This can enable a business to reallocate IT operations and focus on other IT goals. In addition, the application is hosted centrally, so updates can be released without users having to reinstall new software. The drawback of SaaS is that the user stores their data on the cloud provider's server. As a result, there could be unauthorized access to the data. This is above and beyond traditional on-premises security issues in that a user's data resides alongside of other cloud customer data, thus rendering the traditional "protect the borders" security model as ineffective.

SUMMARY

A cloud computing system includes a plurality of cloud resident applications. The plurality of cloud resident applications resides on one or more computer readable media and is executable by one or more computer processors. There is a plurality of tenants. The tenants include multiple corresponding users, and the tenants are permitted to access one or more of the plurality of cloud resident applications. The tenants and the corresponding users are associated with one or more business organizations.

The cloud computing system also includes an input governance layer that is associated with each application, and an output governance layer that is associated with each application—together referred to as the governance layer. The input governance layer and the output governance layer include an encapsulation of a cloud resident application. The input and output governance layers are configured to perform several tasks. First, they receive a request from a tenant-user to access a first application on the cloud computing system. Second, they check a governance database to determine if the tenant-user is authorized to access the first application. Third, when the tenant-user is authorized to access the first application, they process the request using the first application, and when the request and the first application generate an output to transmit to a second application in the cloud computing system, they check the governance database to determine if the tenant-user is authorized to transmit the output to the second application. Fourth, when the tenant-user is not authorized to access the first application, they prevent the request from accessing the first application, and transmit an indication of the tenant-user and the request to a cloud system security administrator. Fifth, when the tenant-user is not authorized to transmit the output to the second application, they transmit an indication of the tenant-user and the output to the cloud system security administrator. Lastly, the governance layer is decoupled from the underlying user application. That is, the governance layer effectively snaps on top of any existing application space. Consequently, the user (and more importantly all users within the cloud platform) are restricted from accessing the governance mapping, thus making it impossible to circumvent these governance checks.

DETAILED DESCRIPTION

Figure 1:
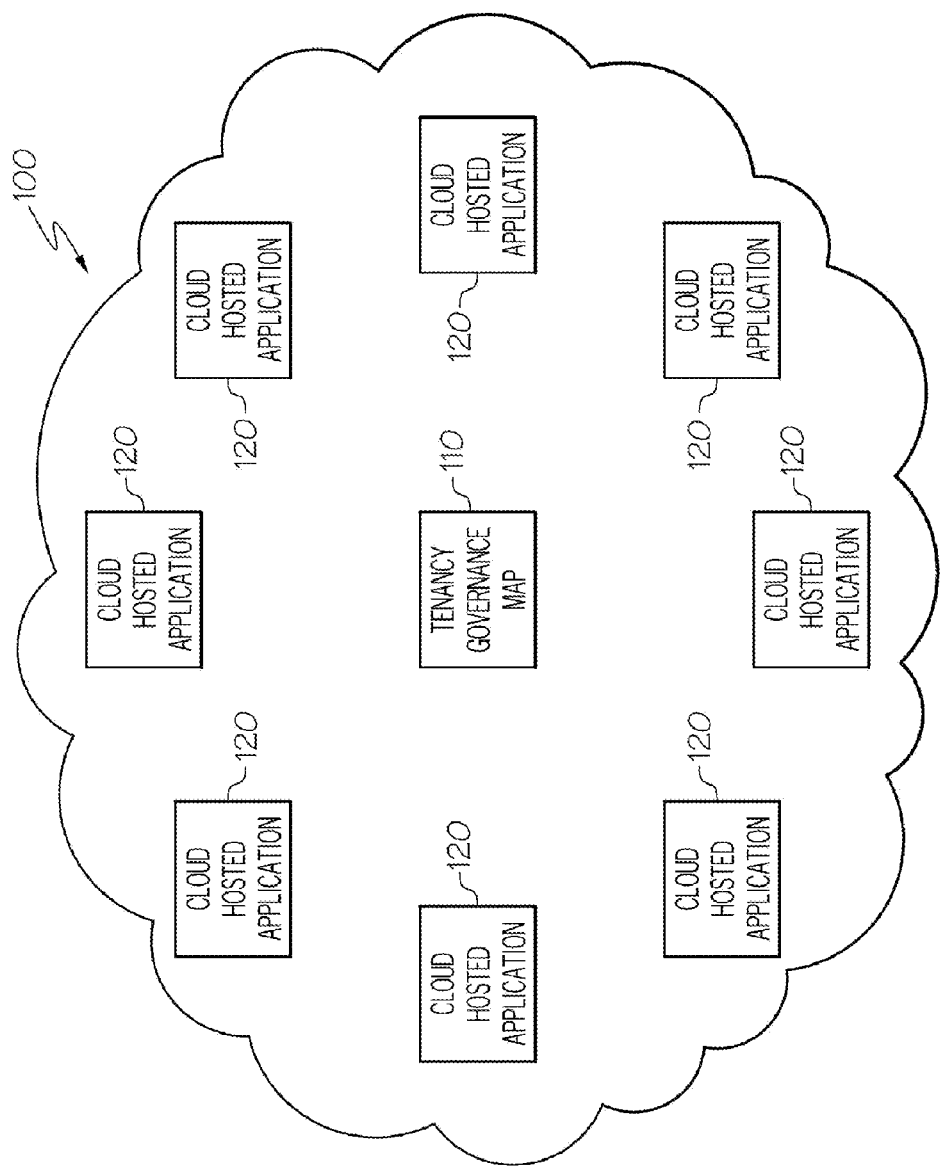
FIG. 1 illustrates an example of a cloud computing system having governance capabilities.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

As indicated above, there could be unauthorized access to data in a cloud computing environment. More specifically, cloud computing environments have not adequately addressed governance issues, that is, assuring that the data from the multiplicity of entities in the cloud computing environment are adequately protected from access by unauthorized entities. While other areas of information technology (IT) such as healthcare medical records and financial records have dealt with the governance issue, there has been no such effort in the cloud computing environment, and in particular to the multi-tenancy aspects of the cloud computing environment. While some cloud systems in general strive to keep the data from different entities separate, there is a lack of clear cloud architecture structure and applications to implement such a technology, and in particular, to implement governance layers. Any such tenancy governance solution in a cloud environment should specifically address governance issues as they apply to tenancy in a multi-tenant environment.

It should be noted that this type of governance is significantly different than governance applied to other market verticals. In traditional on premises solutions, governance is typically applied to ensure data integrity when it comes to their user community. It doesn't concern itself with the security rules or workflow of the underlying application, only for example in a health care environment that a given user has permission to access a given patient's records. If the given user does not have this permission, the transaction is blocked. Similar systems are applied to the trading room floor in the security markets. In all cases, governance concerns itself with monitoring user access relative to the internal data. However, governance in the cloud is different. Rather than focus on the user/data access, cloud governance concerns itself with tenancy access. Cloud governance attempts to keep one tenant (cloud customer) from accessing or even knowing the existence of another cloud customer. Analogously, it would be the equivalent of having two hospitals within the same building, but with neither one knowing of the other's existence.

In an embodiment, multi-tenancy governance constitutes an independent, embedded layer within all cloud-based solutions in a cloud environment. It includes a fast lookup process (i.e., real time or near real time) that is applied to all messages as the messages flow between the components that makeup a cloud offering and/or application. Messages that have not been registered within the governance layer are prevented from flowing within the larger software as a service (SaaS) application.

In an embodiment, in order to allow message flow within the cloud environment, a security administrator, who is independent from a typical cloud system operator, has the task of adding entries to a governance datastore, thereby permitting specific tenants to communicate (similar to the manner is which entries are added to a firewall to allow communications between two computer systems). In an embodiment, a separate process is built into each appliance (or application or component of an application), and the multi-tenancy governance therefore cannot be circumvented or excluded from a final product in the cloud environment. This feature adds to the security aspect of the governance layers.

A concept behind tenancy governance is that, in order for messages to be accidentally misrouted, two separate and independent mistakes must be made. First, an application developer must define connector routing properties incorrectly and the security administrator must make a similar mistake. While it is entirely possible that both the application developer and the security administrator could make such mistakes, because the two entities get their information from separate sources, it is unlikely they would both make the same mistake.

Allowing tenants to accidentally share (or even worse purposefully skim) data would be detrimental to any cloud provider's reputation. The ramifications of such a breech would transcend business risks and would likely have legal ramifications. Consequently, an embodiment of a cloud environment governance implementation creates a layer whose sole purpose is to monitor inter-tenant communications and verify routing. It is worth noting that such a governance layer is not a replacement for normal security-based authentication, authorization, and accounting (AAA) practices, but rather is meant to bolster border security.

Figure 2:
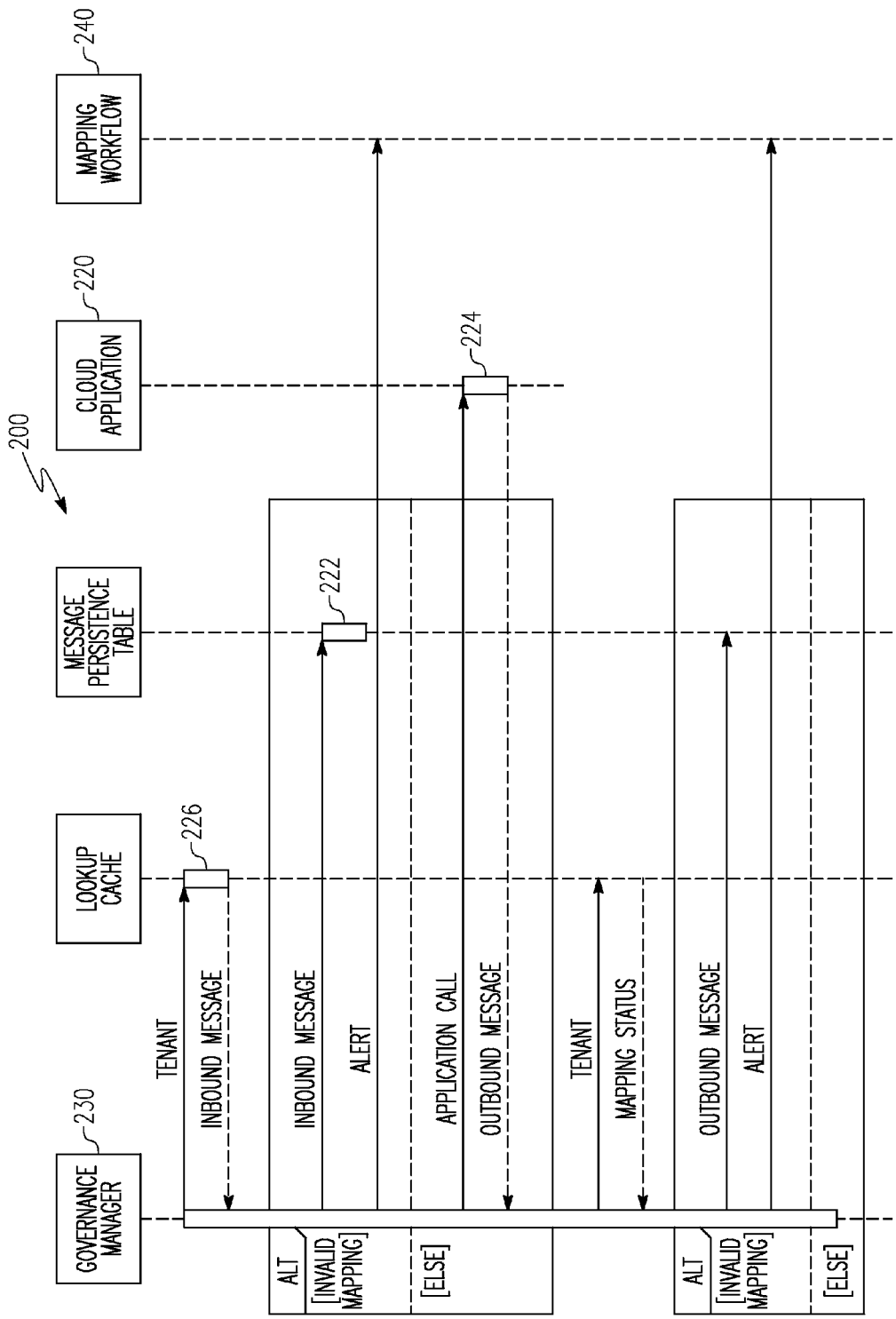
FIG. 2 illustrates another example of a cloud computing system having governance capabilities.
Figure 3:
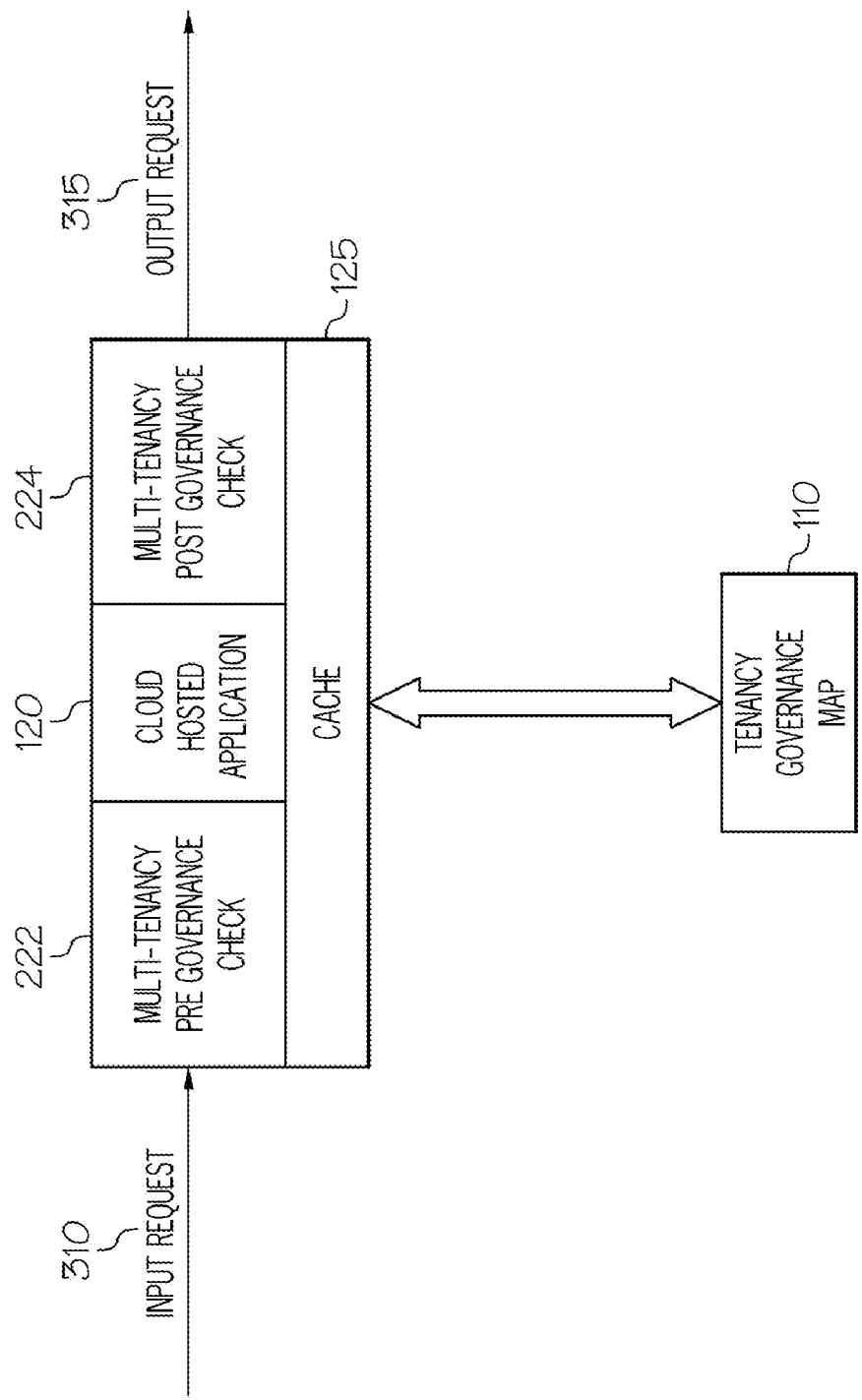
FIG. 3 illustrates a cloud resident application, a multi-tenancy pre-governance module, a multi-tenancy post governance module, and a tenancy governance map.

FIGS. 1 and 2 illustrate embodiments of cloud computing system environments having multi-tenancy governance capabilities. Specifically, FIG. 1 illustrates a cloud computing system 100, which includes a tenancy governance map 110 and a plurality of cloud hosted (or cloud resident) applications 120. Similarly, FIG. 2 illustrates a cloud computing system 200 having multi-tenancy governance capabilities. Specifically, the cloud computing system 200 includes a plurality of cloud hosted applications 220. The applications 220 include input governance layers 222 and output governance layers 224. FIG. 3 illustrates in more detail the cloud hosted application 120, the multi-tenancy pre-governance module 222, the multi-tenancy post governance module 224, and the tenancy governance map 110. The tenancy governance map 110 can be stored in a cache memory 125. As further illustrated in FIG. 3, input 310 enters into the multi-tenancy pre-governance module 222, and is processed by the cloud hosted application 120 if the tenant or user passes the pre-governance check. After the processing by the cloud hosted application 120, any output of the cloud hosted application is checked by the multi-tenancy post governance module 224, and the output 315 is handled appropriately as will be explained in detail herein. In the event that a message fails either the input or output tenancy checks, it is redirected to governance manager 230, which controls its associated local store 226. This persisted store exists for the benefit of the cloud provider operator. As noted in FIG. 2, this workflow queue (240) exists outside the purview of the hosted application(s) 220. Consequently, an input message that fails the governance check persists for future attention by the cloud provider operator. In a similar manner, a message that fails the output check is likewise redirected to the persisted store. These redirections not only happen without the knowledge of the encapsulated application, but the redirection process and the persisted workflow queues are explicitly beyond the reach of the applications.

FIG. 2 further illustrates that the process does not end when a message is intercepted and directed by the governance manager 230 and archived to the local store. As part of the redirection process, a notification message is generated by the governance manager 230 and sent to the Mapping Workflow Alert Notification engine 240. A mapping workflow and alert modification module, which as will be explained in more detail below, informs a cloud security administrator when a tenant or user attempts to violate a governance policy. Any such governance violation issues are handled by the cloud security administrator via an administrator module. The Administrator module includes a login module, which permits only a cloud security administrator and other authorized persons to login and access and use the privileges of the administrator module. The administrator module includes a mapping workflow queue, which receives and stores from the cloud system 200 any actions by a tenant or user that violate the governance policy. A map-tuple module contains the tenants of the cloud system 200 and the corresponding users for each tenant. An administrator can view unmapped tenants using an unmapped tenant module. An administrator can view the mapping workflow queue using a dequeue message module, and update the governance database as necessary using the update governance map module.

In FIGS. 1 and 2, each one of the cloud hosted applications 120, 220 reside on one or more computer readable storage media and are executed by one or more computer processors. In the cloud computing environments 100, 200, there exist a plurality of tenants. Each of the tenants can have associated therewith a plurality of individual users. For example, tenants may be business organizations such as a company or corporation, and the tenant users are the employees of the business organization. That is, as is typical and indeed a purpose of a cloud computing environment, several different companies use the hardware and software resources of the cloud provider/administrator/operator. The companies can use applications created and maintained by the cloud operator, and/or have its own applications placed within the cloud and executed within the cloud environment. Access to the cloud hosted applications within the cloud computing systems 100, 200 is controlled via the tenancy governance map 110, and such access control can be at the tenancy level (i.e., all users of a particular tenant are allowed access to a particular cloud hosted application) or the user level (i.e., only certain users of a tenant are allowed access to a particular cloud hosted application).

Figure 4:
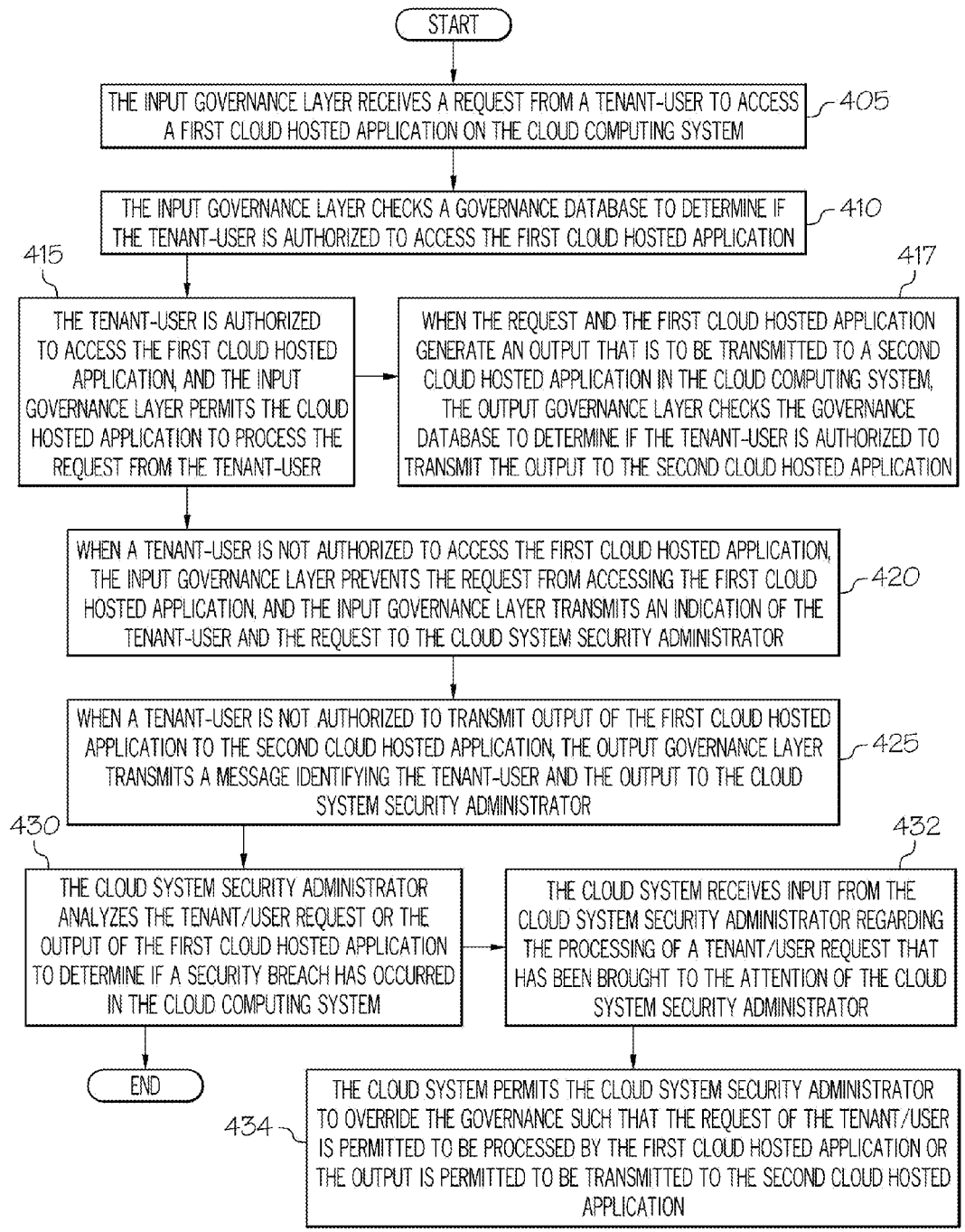
FIG. 4 is a flowchart illustrating an example embodiment of a process to implement a governance policy within a cloud computing environment.
Figure 5:
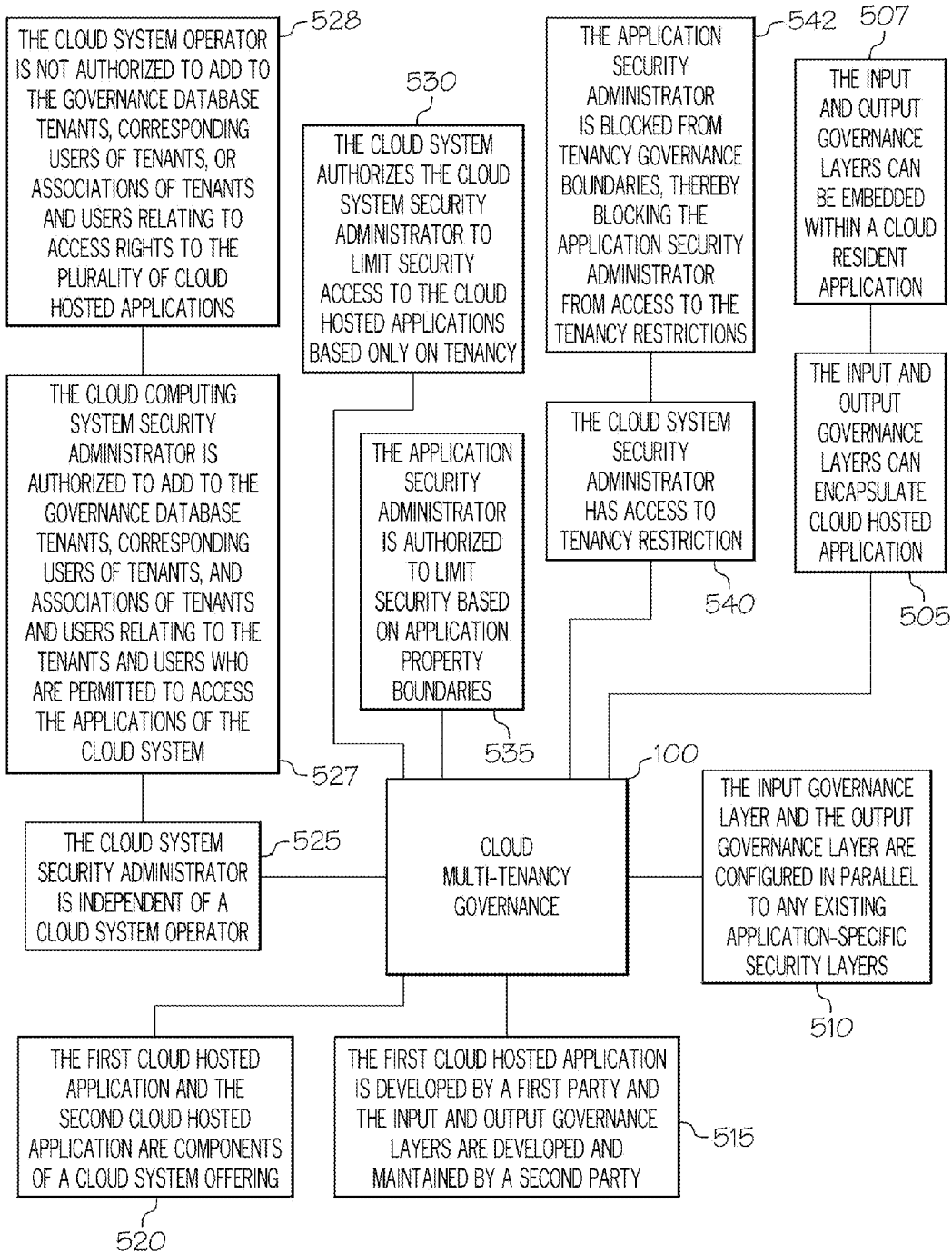
FIG. 5, which can be read in conjunction with FIG. 4, illustrates additional features of a cloud computing system having governance capabilities.
Figure 6:
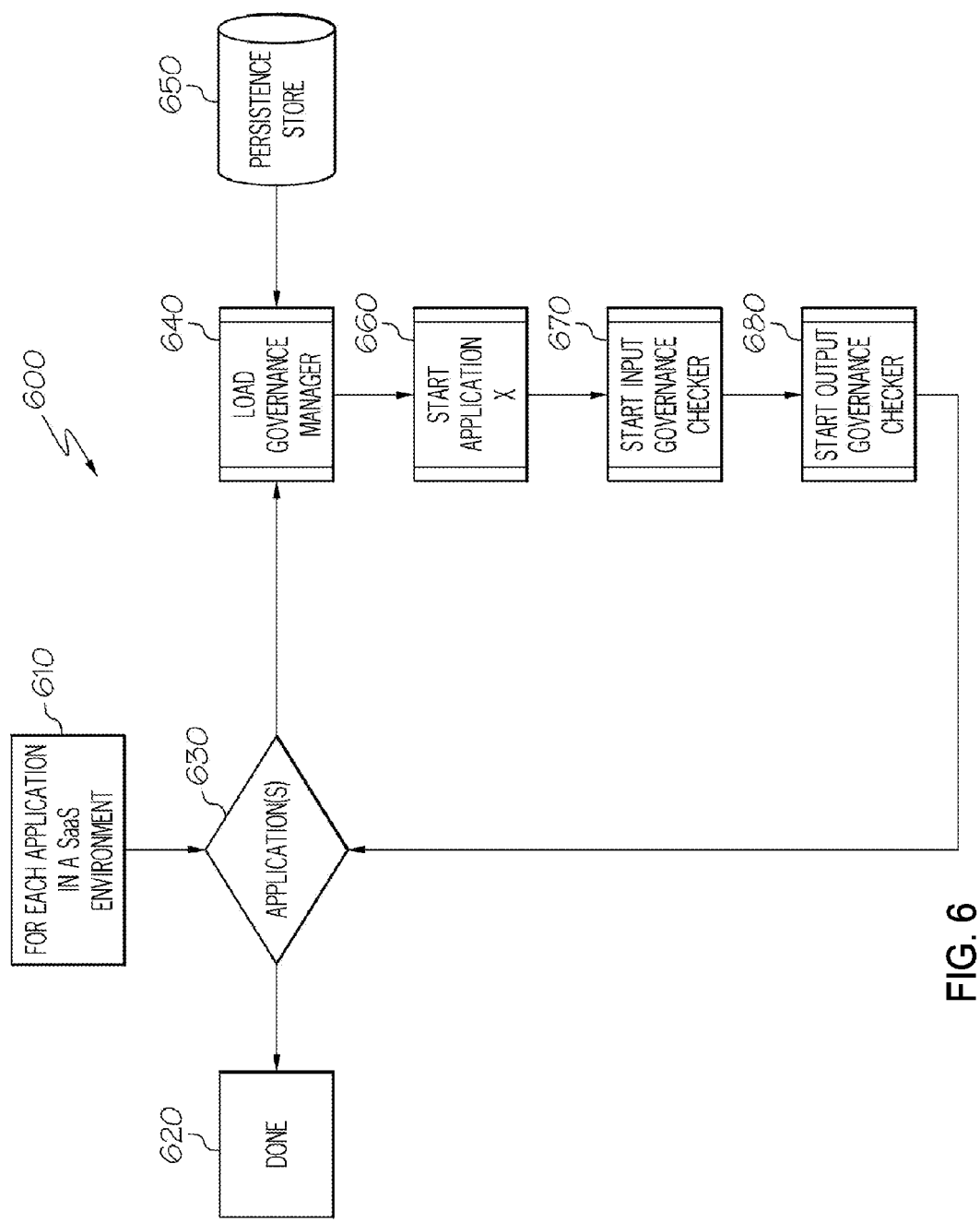
FIG. 6 is a flowchart illustrating an example embodiment of a process to start applications with governance protection within a Software as a Service (SaaS) envelope.
Figure 7:
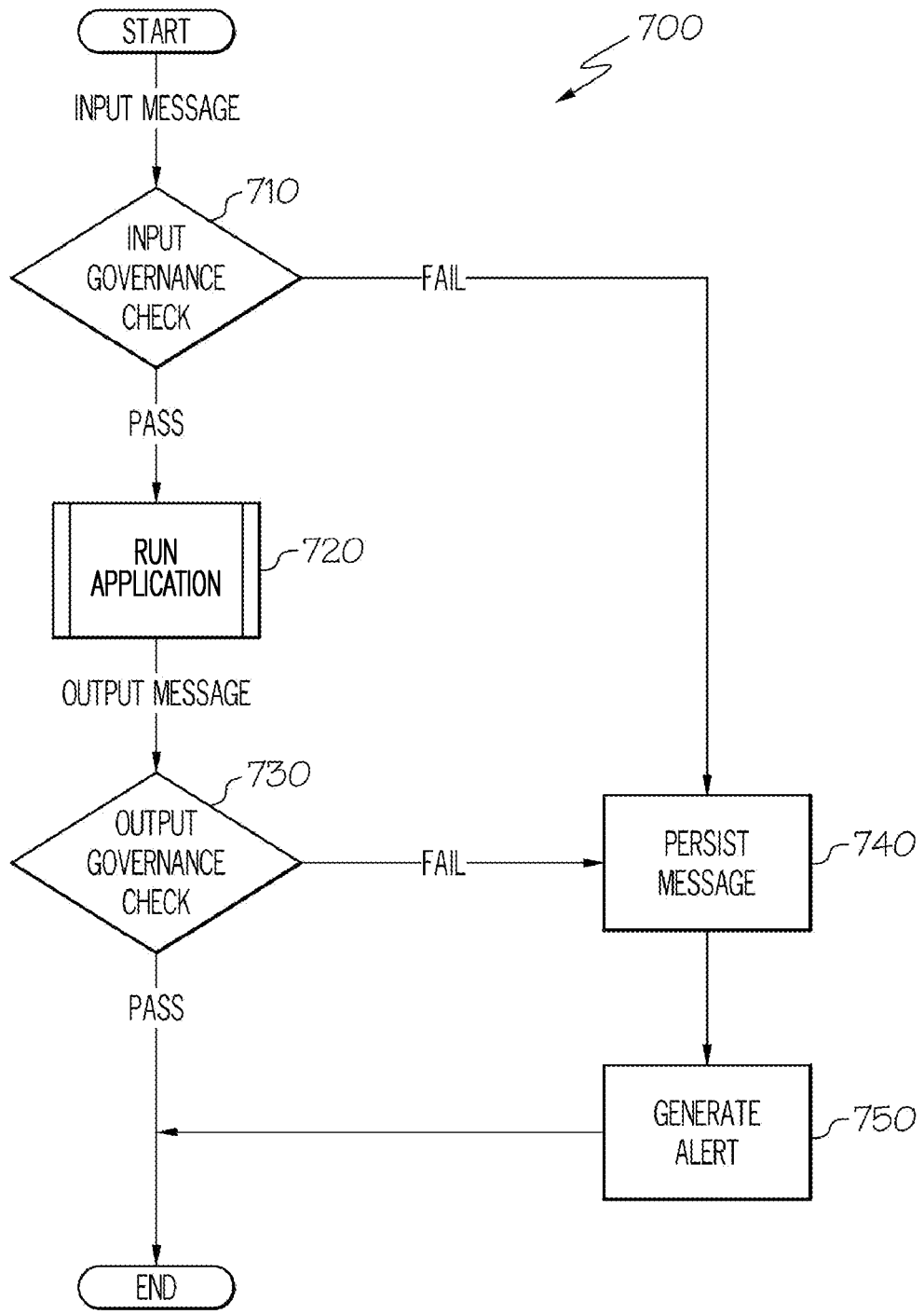
FIG. 7 is a flowchart illustrating an example embodiment of a message flow within a governance system.

FIGS. 4, 6, and 7 are flowcharts illustrating example embodiments of processes to implement a multi-tenancy governance policy within a cloud computing environment. FIG. 4 includes a number of process blocks 405-434, FIG. 6 includes a number of process blocks 610-680, and FIG. 7 includes a number of process blocks 710-750. Though arranged substantially serially in the examples of FIGS. 4, 6, and 7, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations. FIG. 5, which can be read and understood in conjunction with FIGS. 4, 6, and 7, illustrates additional features of a cloud computing system having multi-tenancy governance capabilities.

FIG. 6 illustrates a process 600 that at 610, 630, for each application in an SaaS (or other cloud) environment, a governance manager is loaded at 640. The persistence store 650 supplies messages to the governance manager at 640. As noted above, if a message fails a governance check, it is not immediately discarded, but rather retained in the persistence store for later attention by the cloud system security administrator. Then, for each application, at 660 the application is started. At 670, an input governance checker is started for the application, and at 680, an output governance checker is started for the application. Additional applications are processed similarly at 630 until all applications have been processed and the process 600 completes at 620.

FIG. 7 depicts a message flow process 700. Beginning with the input of a message at 710, an input governance check is applied to the message. If the input governance check fails, the message is persisted at 740, and an alert is transmitted to the cloud security administrator at 750. If the message passes the input governance check, the SaaS application is executed at 720, and an output message is handled by the output governance check 730. If the output governance check fails, the message is persisted at 740, and an alert is transmitted to the cloud system security administrator at 750. If the message passes the output governance check, the message is transmitted to its destination and the process ends.

FIG. 5 indicates at 505 that the input and output governance layers can encapsulate a cloud hosted application. At 507, FIG. 5 further indicates that the input and output governance layers can be embedded within a cloud resident application. This encapsulation/embedding provides one or more features to the governance system. First and foremost, it permits the governance system to control access to the hosted applications within the cloud system. Second, as illustrated at 510, the input governance layer and the output governance layer are configured in parallel to any existing application-specific security layers. Consequently, in a cloud computing environment that already exists and is up and running, an embodiment of the governance systems 100, 200 can be installed in a parallel fashion to an already existing application-specific security layers, and such governance and application security layers can each perform their own functions and complement each other. This is particularly useful because as indicated at 515, in an embodiment of the governance systems 100, 200, the first cloud hosted application is developed by a first party and the input and output governance layers are developed and maintained by a second party. That is, there is generally a technology company (cloud provider) whose business is to offer cloud computing services (e.g., Software as a Service (SaaS), Infrastructure as a Service (IaaS), Platform as a Service (Paas)), and there are other companies who are not primarily software companies, but who have their own software applications that they would like to run on the cloud (and/or use the software applications of the cloud provider).

FIG. 4 illustrates at 405 that the input governance layer 222 receives a request from a tenant-user to access a first cloud hosted (or cloud resident) application on the cloud computing system 100,200. At 410, the input governance layer 222 checks a governance database 110 to determine if the tenant-user is authorized to access the first cloud hosted application. As indicated at 415, the tenant-user is authorized to access the first cloud hosted application, and the input governance layer 222 permits the cloud hosted application to process the request from the tenant-user. Additionally, as indicated at 417, when the request and the first cloud hosted application generate an output that is to be transmitted to a second cloud hosted application in the cloud computing system, the output governance layer 224 checks the governance database 110 to determine if the tenant-user is authorized to transmit the output to the second cloud hosted application. As illustrated at 520, the first cloud hosted application and the second cloud hosted application are components of a cloud system offering At 420, when a tenant-user is not authorized to access the first cloud hosted application, the input governance layer 222 prevents the request from accessing the first cloud hosted application, and the input governance layer 222 transmits an indication of the tenant-user and the request to the cloud system security administrator 250. At 425, when a tenant-user is not authorized to transmit output of the first cloud hosted application to the second cloud hosted application, the output governance layer 224 transmits a message identifying the tenant-user and the output to the cloud system security administrator 250. At 430, the cloud system security administrator 250 analyzes the tenant/user request or the output of the first cloud hosted application to determine if a security breach has occurred in the cloud computing system. At 432, the cloud system can receive input from the cloud system security administrator regarding the processing of a tenant/user request that has been brought to the attention of the cloud system security administrator. At 434, the cloud system permits the cloud system security administrator to override the governance such that the request of the tenant/user is permitted to be processed by the first cloud hosted application or the output is permitted to be transmitted to the second cloud hosted application.

Returning to FIG. 5, which as noted above illustrates several features of the multi-tenancy cloud governance of this disclosure, at 525, the cloud system security administrator is independent of a cloud system operator. This architecture permits the operator to concentrate on and implement the execution of the cloud system, and the security of the system at the application level. This architecture also permits the cloud system security administrator to concentrate on and implement the governance of the cloud system. As noted above, the application security and the governance-implemented security can complement each other. Block 527 illustrates that in an embodiment of a cloud system, the cloud computing system security administrator is authorized to add to the governance database tenants, corresponding users of tenants, and associations of tenants and users relating to the tenants and users who are permitted to access the applications of the cloud system (i.e, the combinations of tenants/users that are permitted to access each particular cloud hosted application). Similarly, block 528 illustrates that the cloud system operator is not authorized to add to the governance database tenants, corresponding users of tenants, or associations of tenants and users relating to access rights to the plurality of cloud hosted applications. These access privileges of a tenant can be referred to as the tenancy scope. Additionally, a tenant may have one or more subtenants that have different access privileges from the tenant and other subtenants. Normally, the tenant has greater access privileges than the subtenants.

At 530, a feature of the cloud system authorizes the cloud system security administrator to limit security access to the cloud hosted applications based only on tenancy. For example, in such a system, the cloud system security administrator is not authorized to grant access to cloud hosted applications for individual users. At 535, the application security administrator is authorized to limit security based on application property boundaries. For example, if there are cloud hosting applications that permit the searching and analysis of the content of documents, the application security administrator may permit virtually any user to access such cloud hosted applications. In contrast, if there are financial and accounting applications that are hosted in the cloud, the application security administrator can permit a smaller segment of users to access and use such applications. Conversely, the cloud tenancy administrator can define subtenant relationships. Consequently, if a cloud tenancy administrator defines a tenant to be a subtenant (e.g., a child tenant to its parent), then that tenant is forever restricted in scope to the boundaries of the parent tenant. By definition, this child/parent relationship limitation cannot be superseded by the application security administrator.

At 540, the cloud system security administrator has access to tenancy restrictions. The tenancy restrictions include the particulars of the cloud privileges of the tenants. The cloud system security administrator can then use these restrictions when he or she is notified of a potential security violation by a tenant, and using his or her access to the tenancy restrictions, can decide whether to allow the user to access the particular cloud hosted application or prevent the tenant from accessing the particular cloud hosted application. In contrast, at 542, the application security administrator is blocked from tenancy governance boundaries, thereby blocking the application security administrator from access to the tenancy restrictions. The features of blocks 540 and 542 maintain the distinction between the cloud security system administrator and the application security administrator.

Figure 8:
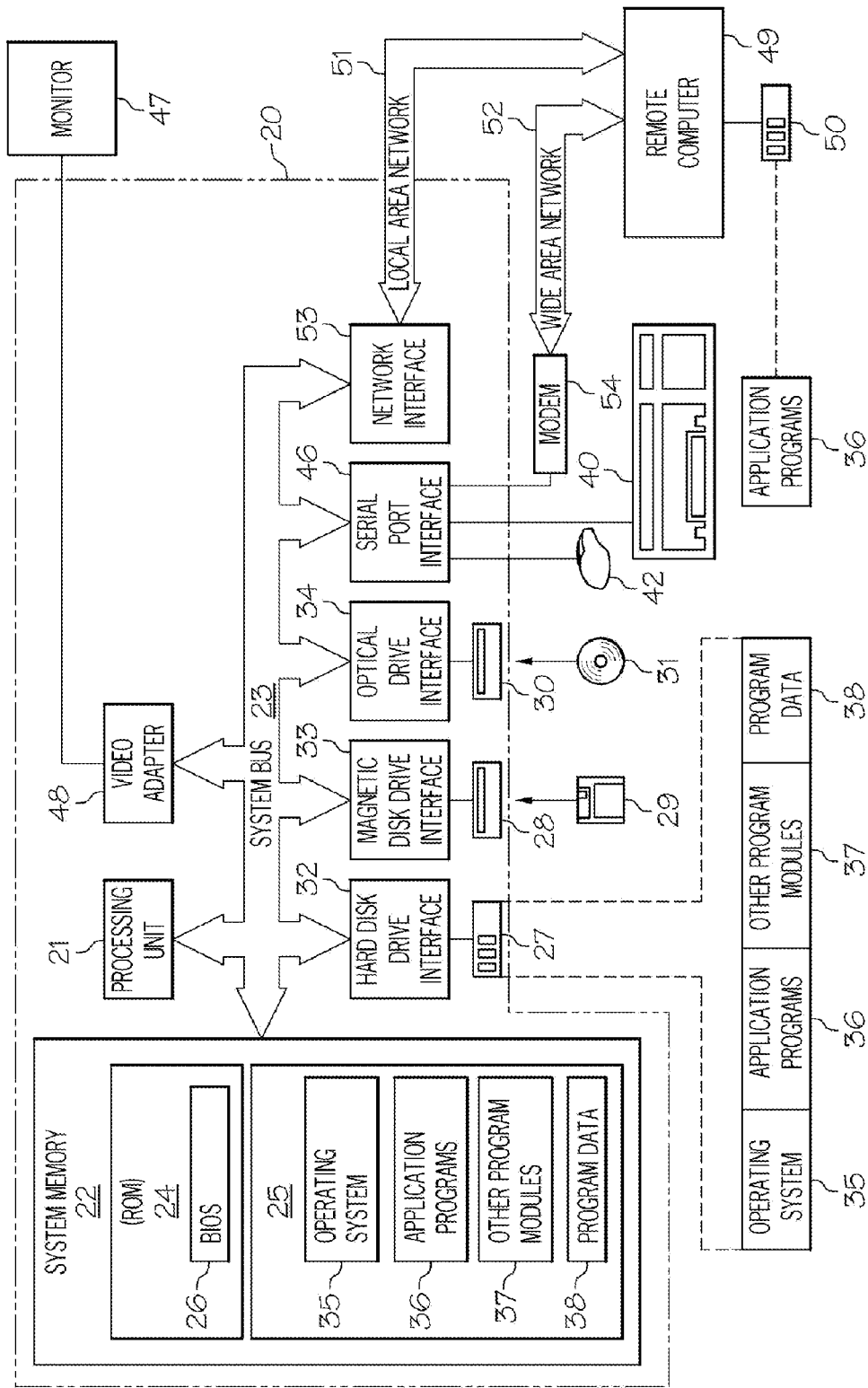
FIG. 8 is a block diagram illustrating an example of a computer system upon which one or more of the embodiments of this disclosure can execute.

FIG. 8 is an overview diagram of hardware and an operating environment in conjunction with which embodiments of the invention may be practiced. The description of FIG. 8 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 8, a hardware and operating environment is provided that is applicable to any of the servers and/or remote clients shown in the other Figures.

As shown in FIG. 8, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/0 relative to the computer 20, although only a memory storage device 50 has been illustrated. The logical connections depicted in FIG. 8 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Thus, an example system, method and machine readable medium for implementing multi-tenancy governance within a cloud computing environment have been described. Although specific example embodiments have been described, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

What is claimed is:

1. A cloud computing system comprising: a plurality of cloud resident applications, wherein the plurality of cloud resident applications reside on one or more computer readable media and are executable by one or more computer processors, wherein each of a plurality of tenants, one or more tenants comprising multiple corresponding users, is permitted to access one or more of the plurality of cloud resident applications, and wherein one or more of the plurality of tenants and its corresponding users are associated with one or more business organizations; an input governance layer associated with each application; and an output governance layer associated with each application; wherein the input governance layer and the output governance layer comprise an encapsulation of a cloud resident application, and the input governance layer and output governance layer are associated with the one or more computer processors and are operable to: receive a request from a tenant-user to access a first application on the cloud computing system; check a governance database to determine if the tenant-user is authorized to access the first application; when the tenant-user is authorized to access the first application, process the request using the first application, and when the request and the first application generate an output to transmit to a second application in the cloud computing system, check the governance database to determine if the tenant-user is authorized to transmit the output to the second application; when the tenant-user is not authorized to access the first application, prevent the request from accessing the first application, and transmit an indication of the tenant-user and the request to a cloud system security administrator; and when the tenant-user is not authorized to transmit the output to the second application, transmit an indication of the tenant-user and the output to the cloud system security administrator, wherein the input governance layer and the output governance layer comprise an embedded layer within the first application that functions to encapsulate the application, wherein the embedded layer is configured in parallel to existing application specific security layers.

2. The cloud computing system of claim 1, wherein the first application and the second application comprise components of a cloud system offering.

3. The cloud computing system of claim 1, wherein the one or more computer processors are operable to receive input from the cloud system security administrator regarding the processing of the request.

4. The cloud computing system of claim 3, wherein the one or more computer processors are operable to process the input received from the cloud system security administrator such that the request is permitted to be processed by the first application or the output is permitted to be transmitted to the second application.

5. The cloud computing system of claim 1, wherein the cloud system security administrator analyzes the request or the output to determine if a security breach has occurred in the cloud computing system.

6. The cloud computing system of claim 1, wherein the cloud system security administrator is independent of a cloud system operator.

7. The cloud computing system of claim 6, wherein the cloud computing system security administrator is authorized to add tenants to the governance database, corresponding users of tenants, and associations of tenants and users to the plurality of applications, and the cloud system operator is not authorized to add to the governance database tenants, corresponding users of tenants, or associations of tenants and users to the plurality of applications.

8. The cloud computing system of claim 1, wherein the cloud system security administrator is authorized to limit security access based on tenancy.

9. The cloud computing system of claim 1, wherein an application security administrator is authorized to limit security based on application property boundaries.

10. The cloud computing system of claim 9,
wherein the cloud system security administrator has access to tenancy restrictions; and
wherein the application security administrator is blocked from tenancy governance boundaries thereby blocking the application security administrator from access to the tenancy restrictions.

11. The cloud computing system of claim 1,
wherein the cloud resident applications comprise application-specific security layers; and
wherein the input governance layer and the output governance layer are configured in parallel to the application-specific security layers.

12. A process comprising: receiving a request from a tenant-user on a cloud computing system to access a first application on the cloud computing system; checking a governance database to determine if the tenant-user is authorized to access the first application; when the tenant-user is authorized to access the first application, processing the request using the first application, and when the request and the first application generate an output to transmit to a second application in the cloud computing system, checking the governance database to determine if the tenant-user is authorized to transmit the output to the second application; when the tenant-user is not authorized to access the first application, preventing the request from accessing the first application, and transmitting an indication of the tenant-user and the request to a cloud system security administrator; and when the tenant-user is not authorized to transmit the output to the second application, transmitting an indication of the tenant-user and the output to the cloud system security administrator; and wherein the cloud computing system comprises: a plurality of cloud resident applications, wherein the plurality of cloud resident applications reside on one or more computer readable media and are executable by one or more computer processors, wherein each of a plurality of tenants, one or more tenants comprising multiple corresponding users, is permitted to access one or more of the plurality of cloud resident applications, and wherein one or more of the plurality of tenants and its corresponding users are associated with one or more business organizations; an input governance layer associated with each application; and an output governance layer associated with each application; wherein the input governance layer and the output governance layer comprise an encapsulation of a cloud resident application, wherein the input governance layer and the output governance layer comprise an embedded layer within the first application that functions to encapsulate the application, wherein the embedded layer is configured in parallel to existing application specific security layers.

13. The process of claim 12, comprising:
receiving input from the cloud system security administrator regarding the processing of the request; and
processing the input received from the cloud system security administrator such that the request is permitted to be processed by the first application or the output is permitted to be transmitted to the second application.

14. The process of claim 12, wherein the cloud system security administrator analyzes the request or the output to determine if a security breach has occurred in the cloud computing system.

15. The process of claim 12,
wherein the cloud system security administrator is independent of a cloud system operator;
wherein the cloud computing system security administrator is authorized to add tenants to the governance database, corresponding users of tenants, and associations of tenants and users to the plurality of applications; and
wherein the cloud system operator is not authorized to add to the governance database tenants, corresponding users of tenants, or associations of tenants and users to the plurality of applications.

16. The process of claim 12,
wherein the cloud system security administrator is authorized to limit security access based on tenancy;
wherein an application security administrator is authorized to limit security based on application property boundaries;
wherein the cloud system security administrator has access to tenancy restrictions;
wherein the application security administrator is blocked from tenancy governance boundaries thereby blocking the application security administrator from access to the tenancy restrictions;
wherein the cloud resident applications comprise application-specific security layers; and wherein the input governance layer and the output governance layer are configured in parallel to the application-specific security layers.

17. A computer readable storage device comprising instructions that when executed by a processor execute a process comprising: receiving a request from a tenant-user on a cloud computing system to access a first application on the cloud computing system; checking a governance database to determine if the tenant-user is authorized to access the first application; when the tenant-user is authorized to access the first application, processing the request using the first application, and when the request and the first application generate an output to transmit to a second application in the cloud computing system, checking the governance database to determine if the tenant-user is authorized to transmit the output to the second application; when the tenant-user is not authorized to access the first application, preventing the request from accessing the first application, and transmitting an indication of the tenant-user and the request to a cloud system security administrator; and when the tenant user is not authorized to transmit the output to the second application, transmitting an indication of the tenant-user and the output to the cloud system security administrator; and wherein the cloud computing system comprises: a plurality of cloud resident applications, wherein the plurality of cloud resident applications reside on one or more computer readable media and are executable by one or more computer processors, wherein each of a plurality of tenants, one or more tenants comprising multiple corresponding users, is permitted to access one or more of the plurality of cloud resident applications, and wherein one or more of the plurality of tenants and its corresponding users are associated with one or more business organizations; an input governance layer associated with each application; and an output governance layer associated with each application; wherein the input governance layer and the output governance layer comprise an encapsulation of a cloud resident application, wherein the input governance layer and the output governance layer comprise an embedded layer within the first application that functions to encapsulate the application, wherein the embedded layer is configured in parallel to existing application specific security layers.

* * * * *